United States Patent [19]
Gee et al.

[11] Patent Number: 5,891,954
[45] Date of Patent: Apr. 6, 1999

[54] METHOD OF MAKING ALCOHOL STABLE EMULSIONS ABD MICROEMULSIONS

[75] Inventors: Ronald Paul Gee; Judith Mervane Vincent, both of Midland, Mich.

[73] Assignee: Dow Corning Corporation, Midland, Mich.

[21] Appl. No.: 929,721

[22] Filed: Sep. 15, 1997

[51] Int. Cl.$^6$ .................................................. C08L 83/06
[52] U.S. Cl. ........................................... 524/837; 524/389
[58] Field of Search ........................................ 524/389, 837

[56] References Cited

U.S. PATENT DOCUMENTS

| | | | |
|---|---|---|---|
| 5,017,221 | 5/1991 | LeGrow | 106/2 |
| 5,300,286 | 4/1994 | Gee | 424/78.03 |
| 5,707,613 | 1/1998 | Hill | 424/78.03 |

FOREIGN PATENT DOCUMENTS

| | | |
|---|---|---|
| 459500 | 12/1991 | European Pat. Off. . |
| 463431 | 1/1992 | European Pat. Off. . |

OTHER PUBLICATIONS

Chemistry & Technology of Silicones, Walter Noll, Academic Press, (1968), pp. 373–376.

*Primary Examiner*—Robert Dawson
*Assistant Examiner*—Caixia Lu-Rutt
*Attorney, Agent, or Firm*—James L. De Cesare

[57] ABSTRACT

A solution of an alcohol stable emulsion or microemulsion containing an organopolysiloxane is made by polymerizing a cyclic siloxane in an aqueous medium containing the cyclic siloxane, a nonionic surfactant, an ionic surfactant, and a catalyst, until an organopolysiloxane of desired molecular weight is obtained; adding a silicone polyether to the emulsion or microemulsion and mixing the silicone polyether and the emulsion or microemulsion to form a blend; and adding the blend of silicone polyether and emulsion or microemulsion to aqueous alcohol. It is beneficial to cool the blend to below 20°–25° C. before adding it to aqueous alcohol. It is also beneficial to mix the silicone polyether and the emulsion or microemulsion without application of mechanically induced shear.

20 Claims, No Drawings

METHOD OF MAKING ALCOHOL STABLE EMULSIONS ABD MICROEMULSIONS

CROSS-REFERENCE TO RELATED APPLICATION

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention is directed to a method of making an emulsion or microemulsion that is stable in the presence of an alcohol.

Thus, when silicone copolyethers are added to silicone-in-water emulsions or microemulsions, stability in the presence of lower alkyl alcohols is the result. Such stability is useful in applications in arenas including personal care, household care, and automotive care, as well as in applications in the coating industry.

Silicone emulsions are not generally stable in the presence of an alcohol. In fact, alcohols such as methanol, ethanol, and isopropanol are used to separate emulsions into two phases in order to analyze their contents.

While European Application 459500 published Dec. 4, 1991, makes reference to the preparation of emulsions and microemulsions in the presence of an alcohol, the European Application fails to teach the combination of an alcohol with a silicone polyether. In fact, silicone polyethers are not even mentioned as being a component in the European Application.

BRIEF SUMMARY OF THE INVENTION

It has been discovered that water-soluble or water-dispersible silicone polyethers, when post-added to previously-prepared silicone emulsions or silicone microemulsions, where organic surfactants are used to emulsify the silicone, provide superior stability to dilution with a lower alkyl alcohol such as ethanol. While stability with respect to ethanol is preferred because of its widespread use in commercial applications, superior stability is also provided to dilution with other lower alkyl alcohols such as methyl alcohol, propyl alcohol, isopropyl alcohol, butyl alcohol, and isobutyl alcohol.

The structural and property relationships appreciated at this time suggest that larger molecular weight silicone polyethers provide the necessary coverage of the silicone particle surface.

Surprisingly, the presence of propylene oxide, which does not contribute to the hydrophilic balance of silicone polyethers has not been determined to be a negative attribute.

It has also been discovered that some features of the method of incorporating the silicone polyether into an emulsion or microemulsion enhance its alcohol stability, the most notable of which is to cool the composition below room temperature (20°–25° C.) after addition of the silicone polyether.

These and other features of our invention will become apparent from a consideration of the detailed description.

BRIEF DESCRIPTION OF THE SEVERAL VIEWS OF THE DRAWINGS

Not applicable.

DETAILED DESCRIPTION OF THE INVENTION

Silicone Polyether

The silicone polyether for use herein has the formula $MD_{10-1,000}D'_{1-100}M$, most preferably the formula $MD_{100-500}D'_{10-50}M$, where M represents monofunctional unit $R_3SiO_{1/2}$, D represents difunctional unit $R_2SiO_{2/2}$, and D' represents difunctional unit $RR'SiO_{2/2}$, in which R is an alkyl group containing 1–6 carbon atoms or an aryl group, and RI is an oxyalkylene containing moiety. R' groups may contain only oxyethylene (EO) units, or a combination of oxyethylene (EO) and oxypropylene (PO) units. Preferred R' groups include oxyalkylene units in the ratio $EO_{10-100}PO_{0-100}$, most preferably $EO_{10-30}PO_{1-30}$.

R' moiety typically also includes a divalent radical such as $-C_mH_{2m}-$ where m is 2–8, for connecting the oxyalkylene portion of moiety R' to the siloxane backbone; as well as a terminating radical for oxyalkylene portion of moiety R', such as hydrogen, hydroxyl, alkyl, aryl, alkoxy, or acyloxy.

The silicone polyether for use herein can also be of a type having formula $M'D_{10-1,000}D'_{0-100}M'$, most preferably formula $M'D_{100-500}D'_{00-50}M'$, where M' represents monofunctional unit $R_2R'SiO_{1/2}$, D represents difunctional unit $R_2SiO_{2/2}$, and D' represents difunctional unit $RR'SiO_{2/2}$, in which R is an alkyl group containing 1–6 carbon atoms or an aryl group, and R' is an oxyalkylene containing moiety. As noted above, R' groups may contain only oxyethylene (EO) units, or a combination of oxyethylene (EO) and oxypropylene (PO) units. Again, preferred R' groups include oxyalkylene units in the ratio $EO_{10-100}PO_{0-100}$, most preferably $EO_{10-30}PO_{1-30}$.

As also noted above, the moiety R' typically includes a divalent radical $-C_mH_{2m}-$ where m is 2–8, for connecting the oxyalkylene portion of moiety R' to the siloxane backbone; as well as a terminating radical for the oxyalkylene portion of moiety R', such as hydrogen, hydroxyl, alkyl, aryl, alkoxy, or acyloxy.

Siloxane-oxyalkylene copolymers, i.e. silicone polyethers, can be prepared according to methods generally described in the standard text on silicone chemistry entitled "Chemistry and Technology of Silicones", by Walter Noll, Academic Press Inc., Orlando, Fla., (1968), on Pages 373–376.

In this regard, Table 1 shows some representative Silicone Polyethers referred to hereafter in our examples.

TABLE 1

| Silicone Polyether | Structure | Weight % EO | Weight % PO | HLB |
|---|---|---|---|---|
| A | EO | 19 | 0 | 6.8 |
| B | EO | 40 | 0 | 8.0 |
| C | EO/PO | 34 | 0.4 | 6.8 |
| D | EO/PO | 41 | 12 | 8.2 |
| E | EO/PO | 34 | 39 | 5.0 |
| F | EO/PO | 32 | 42 | 6.4 |
| G | EO/PO | 30 | 40 | 5.7 |

Silicone Polyethers A and B contained less than 20 D units and less than 5 D' units. Silicone Polyethers C–G contained from 100–200 D units and 10–30 D' units.

In Table 1, hydophilic lipophilic balance (HLB) is determined by calculating the weight percent of EO and dividing this value by five.

Emulsion, Microemulsion & Preparation

Silicones are often provided as aqueous emulsions or microemulsions of a polydimethylsiloxane stabilized in the emulsion or microemulsion by one or more ionic or nonionic surfactants. Such emulsions and microemulsions can be prepared mechanically or by emulsion polymerization, but according to our invention, emulsions and microemulsions prepared by emulsion polymerization are preferred.

The siloxane in the aqueous emulsion or microemulsion can be a linear or branched chain siloxane fluid having a viscosity of about 100–300,000 mm²/s (cS) at 25° C. Most useful are siloxane polymers and copolymers having a viscosity in the range of about 300–60,000 mm₂/s, most preferably about 350–15,000 mm²/s. A mixture of siloxanes having relatively higher and relatively lower viscosity can also be employed.

Such polysiloxanes contain the characteristic difunctional repeating "D" unit:

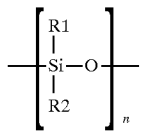

in which n is greater than 1; and $R^1$ and $R^2$ are each independently alkyl radicals containing 1–7 carbon atoms or a phenyl group.

Illustrative siloxanes are polydimethylsiloxane, polydiethylsiloxane, polymethylethylsiloxane, polymethylphenylsiloxane, and polydiphenylsiloxane. Preferably, the siloxane is trimethylsiloxy-terminated, but it can include hydroxy-endblocking units as well.

While the siloxane can contain "D" units other than dimethylsiloxane, such as diphenyl siloxane or methylphenyl siloxane, from the standpoint of economics, siloxane polymers with dimethylsiloxane "D" units —[(CH₃)₂SiO]— are most preferred. Yet, in some instances, it might be appropriate for $R^1$ or $R^2$ to be another functional group, such as an aminoalkyl, carboxyalkyl, haloalkyl, acrylate, acryloxy, acrylamide, or vinyl group, for example.

To contrast the difference between techniques for preparing silicone containing emulsions and microemulsions, it is noted that a mechanical emulsion is typically a composition containing a trimethylsiloxy-terminated polydimethylsiloxane stabilized by a nonionic surfactant. The siloxane is generally present in the emulsion in the form of particles having a diameter greater than 140 nanometer (0.14 micrometer) but less than 350 nanometer (0.35 micrometer), most preferably less than 300 nanometer (0.3 micrometer). These mechanical emulsions are prepared by known mechanical processes such as are described in U.S. Pat. 5,017,221 (May 21, 1991) and in EP 463431 (Jan. 2, 1992), for example.

According to such mechanical processes, water, one or more nonionic surfactants, and the siloxane, are simply mixed together, and homogenized using a laboratory homogenizer or other device for applying vigorous agitation. These mechanical emulsions typically have a pH of 7–9.5, and contain 10–80% by weight of the siloxane, preferably 20–60%, 0.01–15% by weight of the nonionic surfactant(s), the balance being water.

On the other hand, and according to our invention, emulsion polymerization is the technique used to prepare suitable aqueous emulsions or microemulsions containing polydiorganosiloxanes, which are stabilized in the emulsions and microemulsions by a nonionic surfactant and an ionic surfactant. The siloxane is present in the microemulsion as particles having a diameter of less than 140 nanometer (0.14 micrometer), preferably less than 50 nanometer (0.05 micrometer). Fine emulsions contain a siloxane as particles with a diameter of 140–300 nanometer (0.14–0.30 micrometer). Standard emulsions contain a siloxane as particles with a diameter greater than 300 nanometer (0.30 micrometer). These emulsions and microemulsions are most preferably prepared by the emulsion polymerization process described in EP 459500 (Dec. 4, 1992) referred to above, and which is considered incorporated herein by reference.

According to that process, stable, oil-free polysiloxane emulsions and microemulsions are prepared by mixing a cyclic siloxane, a nonionic surfactant, an ionic surfactant, water, and a condensation polymerization catalyst. The mixture is heated and agitated at a polymerization reaction temperature until essentially all of the cyclic siloxane is reacted, and a stable, oil-free emulsion or microemulsion is formed. The emulsions and microemulsions typically have a pH of 6–7.5, and contain 10–70% by weight of the siloxane polymer, preferably 25–60%, 0.5–30% by weight of the nonionic surfactant, 0.05–30% by weight of the ionic surfactant, preferably 0.5–20%, the balance being water.

Nonionic Organic Surfactant

Any conventional nonionic surfactant can be used to prepare the emulsions and microemulsions. For example, one suitable type of nonionic emulsifier is an ethoxylated fatty alcohol. Such fatty alcohol ethoxylates contain the characteristic —(OCH₂CH₂)ₐOH group attached to a fatty hydrocarbon residue of about 8–20 carbon atoms such as lauryl (C₁₂), cetyl (C₁₆) and stearyl (C₁₈). Integer "a" can be 1–100 but is more typically 12–40.

Examples of commercial products include various polyoxyethylene fatty alcohols sold under the tradename BRIJ by ICI Americas Incorporated, Wilmington, Del.; the tradename EMERY by the Henkel Corporation/Emery Group, Ambler, Pa.; the trademark ETHOSPERSE® by Lonza Incorporated, Fairlawn, N.J.; and the trademark PROMULGEN® by the Amerchol Corporation, Edison, N.J.

One especially useful nonionic surfactant is BRIJ 35 Liquid. This polyoxyethylene (23) lauryl ether has an HLB value of about 16.9 and the formula C₁₂H₂₅(OCH₂CH₂)₂₃OH. Laureth-23 is the International Nomenclature Cosmetic Ingredient (INCI) name assigned by The Cosmetic, Toiletry, and Fragrance Association, Washington, D.C., (CTFA), to polyoxyethylene (23) lauryl ether. Laureth-23 is also sold under the trademark AMEROXOL® LE-23 by the Amerchol Corporation, Edison, N.J.; the tradename EMTHOX 5877 by the Henkel Corporation/Emery Group, Ambler, Pa.; the trademark MACOLO® LA-23 by PPG/Mazer, Gurnee, Ill.; and the trademark WITCONOL® 5964 by the Witco Corporation, New York, N.Y.

Other useful polyoxyethylene fatty alcohols are polyoxyethylene (4) lauryl ether (LAURETH-4), polyoxyethylene (2) cetyl ether (CETEARETH-2), polyoxyethylene (10) cetyl ether (CETEARETH-10), polyoxyethylene (20) cetyl ether (CETEARETH-20), polyoxyethylene (2) stearyl ether (STEARETH-2), polyoxyethylene (10) stearyl ether (STEARETH-10), polyoxyethylene (20) stearyl ether (STEARETH-20), polyoxyethylene (21) stearyl ether (STEARETH-21), polyoxyethylene (100) stearyl ether (STEARETH-100), polyoxyethylene (2) oleyl ether (OLETH-2), polyoxyethylene (10) oleyl ether (OLETH-10), and polyoxyethylene (20) oleyl ether (OLETH-20).

Some additional suitable commercial nonionic surfactants are ethoxylated alcohols sold under the trademark TERGITOL®, and ethoxylated alkyl phenols sold under the trademark TRITON® by Union Carbide Corporation, Danbury, Conn. Similar products are marketed as NEODOL® by Shell Chemical Company, Houston, Tex.; MACOL® by PPG Industries, Gurnee, Ill.; and TRYCOL by Henkel Corporation, Ambler, Pa.

Another useful nonionic surfactant for preparing emulsions and microemulsions according to our invention is ISOLAURETH-6, which is CTFA's INCI designation for the polyethylene glycol ether of branched chain aliphatic 12 carbon containing alcohols conforming to the formula $C_{12}H_{25}(OCH_2CH_2)_6OH$. In preparing emulsions and microemulsions with this surfactant, a small amount of an anionic surfactant such as the sodium salt of an alkylaryl polyether sulfate may be included.

In addition, fatty acid alkanolamides or amine oxides can be used. Fatty acid alkanolamide surfactants include fatty acid diethanolamides such as isostearic acid diethanolamide, lauric acid diethanolamide, capric acid diethanolamide, coconut fatty acid diethanolamide, linoleic acid diethanolamides, myristic acid diethanolamide, oleic acid diethanolamide, and stearic acid diethanolamide; fatty acid monoethanolamides such as coconut fatty acid monoethanolamide; and fatty acid monoisopropanolamides such as oleic acid monoisopropanolamide and lauric acid monoisopropanolamide. Representative commercial products are sold under the trademark WITCAMIDE® by Witco Corporation, New York, N.Y.

Amine oxide surfactants include N-alkyl amine oxides such as N-cocodimethylamine oxide, N-lauryl dimethylamine oxide, N-myristyl dimethylamine oxide, and N-stearyl dimethylamine oxide; N-acyl amine oxides such as N-cocamidopropyl dimethylamine oxide and N-tallowamidopropyl dimethylamine oxide; and N-alkoxyalkyl amine oxides such as bis(2-hydroxyethyl) $C_{12-15}$ alkoxy-propylamine oxide. Other amine oxide surfactants are lauric acid diethanolamide, N-lauryl dimethylamine oxide, coconut acid diethanolamide, myristic acid diethanolamide, and oleic acid diethanolamide. Commercial products are sold under tradenames and trademarks such as AMMONYX by the Stepan Company, Northfield, Ill.; BARLOX® by Lonza Incorporated, Fairlawn, N.J.; and MACKAMINE by The McIntyre Group Limited, University Park, Ill.

Sorbitan derivatives sold under the tradenames SPAN and TWEEN by ICI Americas Incorporated, Wilmington, Del.; and propylene oxide-ethylene oxide block polymers sold under the trademark PLURONIC® by BASF Corporation, Parsippany, N.J.; may also be employed.

Ionic Organic Surfactant

The ionic surfactant used to prepare the emulsion or microemulsion can be any conventional anionic emulsifier including sulfonic acids and their salt derivatives. Some useful anionic surfactants are alkali metal sulforicinates; sulfonated glyceryl esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acids nitrites such as palmitonitrile sulfonate; sulfonated aromatic hydrocarbons such as sodium alpha-naphthalene monosulfonate; condensation products of naphthalene sulfonic acids with formaldehyde; sodium octahydroanthracene sulfonate; alkali metal alkyl sulfates, ether sulfates having alkyl groups of 8 or more carbon atoms, and alkylarylsulfonates having one or more alkyl groups of 8 or more carbon atoms. Commercial anionic surfactants include alkylarylsulfonates such as dodecylbenzenesulfonic acid sold under the tradename BIO-SOFT S-100 by the Stepan Company, Northfield, Ill.

The ionic surfactant can also be any conventional cationic emulsifier used in emulsion polymerization. Such cationic surfactants include fatty acid amines, amides, and their salts. Suitable cationic surfactants are exemplified by aliphatic fatty amines and their derivatives such as dodecylamine acetate, octadecylamine acetate, and acetates of the amines of tallow fatty acids; homologues of aromatic amines having fatty chains such as dodecylanalin; fatty amides derived from aliphatic diamines such as undecylimidazoline; fatty amides derived from di-substituted amines such as oleylaminodiethylamine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethyl sterarylamide; amine salts of long chain fatty acids; quaternary ammonium bases derived from fatty amides of di-substituted diamines such as oleylbenzylaminoethylene diethylamine hydrochloride; quaternary ammonium bases of benzimidazolines such as methylheptadecyl benzimidazol hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as condensation products of stearic acid and diethylene triamine; polyethylene diamines; and polypropanol polyethanolamines. Examples of commercial cationic surfactants are products sold under such tradenames as ARQUAD T-27W, ARQUAD 16–29, ARQUAD C-33, ARQUAD T-50, and ETHOQUAD T/13 ACETATE, by AKZO Chemicals, Inc., Chicago, Ill.

Catalyst

Any catalyst that is capable of polymerizing cyclic siloxanes in the presence of water is useful in the preparation of the emulsion or microemulsion. Catalysts include condensation polymerization catalysts capable of cleaving siloxane bonds. Some examples of condensation polymerization catalysts are strong acids such as substituted benzenesulfonic acids, aliphatic sulfonic acids, hydrochloric acid, and sulfuric acid; and strong bases such as quaternary ammonium hydroxides and metal hydroxides. Ionic surfactants such as dodecylbenzenesulfonic acid can additionally function as catalyst. Other useful catalytic systems include phase transfer catalysts such as tetrabutyl ammonium hydroxide, or ion exchange resins where a catalyst is formed in situ.

Method

Silicone polyethers (SPE) A–G shown above in Table 1 were added to a polydiorganosiloxane anionic or cationic microemulsion (MEM) prepared by the emulsion polymerization process. The amount of SPE employed can be between about 1–20 percent by weight, but is preferably about 5–10 percent by weight, based on the total weight of the blend of the SPE and the MEM. The MEM contained about 23 weight percent of silicone solids. After the SPE/MEM blend was made, it was added to mixtures of water and ethanol at a level of about 5 weight percent silicone.

The initial percent transmittance (% T) of the aqueous ethanol solution was measured using a Spectronic 21 Spectrophotometer manufactured by the Milton Roy Company. Stability was monitored by measuring the % T, and making visual observations of the solution. Time to Fail was determined and was reported as an Initial Stability and as a Long Term Stability, and indicates how long the solution was stable, as initially prepared and over the longer term. Instability for purposes of our invention, is defined as being indicated by the silicone coming out of the solution, and/or the % T falling to a value below 70 percent.

EXAMPLES

The following examples are set forth in order to demonstrate our invention in more detail.

Example I

An emulsion polymer was prepared from cyclic siloxanes according to technique described in European Patent Application 459500 published Dec. 4, 1991, using a combination of an anionic surfactant and a nonionic surfactant. The resulting polydimethylsiloxane homopolymer had a viscosity of approximately 86,000 cP/mPa.s as measured on a Brookfield cone/plate viscometer Model HBDV-III, with spindle CP-52 at 2.5 rpm. This microemulsion, referred to hereafter as Microemulsion A, contained 23% by weight of the homopolymer which had a particle size in the microemulsion of 33 nanometer as measured with a Leeds & Northrup Microtrac® UPA particle sizer. Microemulsion A was added to a container in an amount equivalent to 92–5 parts, and 7.5 parts of Silicone Polyether A were added and mixed until a uniform blend was obtained.

Example II

To a container, 17.2 parts of the blend in Example I containing 5.2 parts of the silicone active were added to 41.4 parts water and mixed. Ethanol was then added in an amount of 41.4 parts. For solutions of microemulsions, clarity was used as an indication of stability. Clarity was determined by measuring the percent transmittance (% T) using a Milton Roy Company Spectronic 21 spectrophotometer at a wavelength of 580 nanometer. The sample was also monitored over time for % T and stability. When the % Transmittance fell below 70, or the solution showed other indications of instability, such as oil appearing on the surface, it was designated a failure. The solution in this example had an initial % T of 75, which fell to 67.5 in one week.

Example III

Silicone Polyether B was added at a level of 10 parts to 90 parts of Microemulsion A and mixed.

Example IV

Silicone Polyether C was added at a level of 10 parts to 90 parts of Microemulsion A and mixed.

Example V

Silicone Polyether D was added at a level of 10 parts to 90 parts of Microemulsion A and mixed.

Example VI

Silicone Polyether E was added at a level of 10 parts to 90 parts of Microemulsion A and mixed.

Example VII

Solutions were prepared from each of the microemulsions in Examples III–VI as follows. To a container, 15.3 parts of each microemulsion in the examples containing 5 parts of the silicone active were added to 26.7 parts water and mixed. Ethanol was then added in the amount of 58 parts. The results are shown below.

| Example | Initial % T | Initial Stability | Long-term Stability |
|---------|-------------|-------------------|---------------------|
| III | 37.5 | fail | Not applicable |
| IV | 87.5 | pass | precipitated in 2 weeks |
| V | 90.8 | pass | % T < 70 in 2 weeks |
| VI | 90.5 | pass | % T = 88.5 after 10 weeks, small amount of polymer precipitate |

A comparison of Examples III and IV illustrates one benefit gained by addition of polypropylene oxide to the silicone polyether. Thus, Example III which incorporated a silicone polyether containing only polyethylene oxide units was immediately unstable. Example IV used a silicone polyether with only a small amount of polypropylene oxide units but had excellent clarity and was stable for 2 weeks. Similarly, Example VI contained a silicone polyether with a higher level of polypropylene oxide units than Example V, and it was much more stable in aqueous ethanol.

Example VIII

Another emulsion polymer was prepared from cyclic siloxanes according to the technique described in European Patent Application 459500, using a combination of an anionic surfactant and a nonionic surfactant. The resulting polydimethylsiloxane homopolymer had a viscosity of approximately 4,800 cP/mPa.s. This microemulsion is referred to as Microemulsion B hereafter, and contained 23% by weight of the homopolymer which had a particle size in the microemulsion of 31 nanometer. After adding 10 parts of the Silicone Polyether F to 90 parts of Microemulsion B, the blend was hand mixed gently by stirring it with a spatula.

Example IX

After adding 10 parts of Silicone Polyether F to 90 parts of Microemulsion B, the mixture was stirred using a high shear blade for 30 minutes.

Example X

After adding 10 parts of Silicone Polyether F to 90 parts of Microemulsion B, the mixture was stirred using a high shear blade, and then it was mixed gently using a laboratory scale air wheel for 24 hours.

Example XI

After adding 10 parts of Silicone Polyether F to 90 parts of Microemulsion B and mixing by hand, the sample was cooled at 0° C. for 24 hours.

Example XII

Aqueous ethanol solutions were prepared using the blends of Examples XVIII–XI. Thus, each microemulsion/silicone polyether blend was mixed at a level of 17.6 parts containing 5.8 parts of the active silicone, with 41.2 parts of water. Ethanol was then added at 41.2 parts. The results are shown below.

| Example | Initial % T | Initial Stability | Long-term Stability |
|---------|-------------|-------------------|---------------------|
| VIII | 89.0 | pass | % T < 70 after 9 weeks |
| IX | 88.0 | pass | % T < 70 after 2 weeks |
| X | 76.0 | pass | % T < 70 after 1 week |
| XI | 89.0 | pass | stable long term |

A comparison of Examples VIII and XI with Examples IX and X demonstrates the negative impact of shear when making Silicone Polyether containing microemulsions. Example XI further suggests that better stability to ethanol can be obtained when the composition is cooled.

Comparative Example 1

This comparative example was conducted to determine if the silicone polyether could be added to the polydimethylsiloxane in the aqueous ethanol solution with the same effect. The solutions of the previous example contained 5.8% silicone active, 1.75% silicone polyether, and 4.0% polydimethylsiloxane. For Comparative Example 1, 15.85 parts of Microemulsion B were added to 41.2 parts water. Then 1.75 parts of Silicone Polyether F were added. After mixing, 41.2 parts of ethanol were added.

Comparative Example 2

To determine how stable a microemulsion without a silicone polyether was in the presence of ethanol, 15.85 parts of Microemulsion B were added to 42.95 parts of water. After mixing, 41.2 parts of ethanol were added.

Comparative Example 3

This example reflects the aqueous stability of a microemulsion and is provided as a reference for clarity. Water was added in the amount of 84.15 parts to 15.85 parts of Microemulsion B.

Shown below are the stability results for Comparative Examples 1–3. Data for Example VI is provided for purpose of comparison with our invention.

| Example | Initial % T | Initial Stability | Long-term Stability |
|---------|-------------|-------------------|---------------------|
| Comparative 1 | 65.0 | fail | Not applicable |
| Comparative 2 | 9.0 | fail | Not applicable |
| Comparative 3 | 86.5 | pass | stable |
| Example VI Solution | 89.0 | pass | stable long term |

The results indicate that mixing a silicone polyether with a microemulsion in solution does not provide the same benefit obtained by formulating the silicone polyether into the microemulsion.

Example XIII

Yet another emulsion polymer was prepared from cyclic siloxanes according to the process described in European Patent Application 459500, using a combination of a cationic surfactant and a nonionic surfactant. The resulting polydimethylsiloxane homopolymer had a viscosity of approximately 1,300 cP/mPa.s. This microemulsion contained 23% by weight of the homopolymer which had a particle size in the microemulsion of 21 nanometer. Ten parts of Silicone Polyether G were added to 90 parts of this cationic microemulsion. An aqueous ethanol solution was then prepared by adding 15.4 parts of the resulting Silicone Polyether containing microemulsion to 26.6 parts of water, followed by the addition of 58 parts of ethanol. The resulting solution had an initial % Transmittance of 87 and was initially stable.

Example XIV

An additional emulsion polymer was prepared from cyclic siloxanes, and an aminoalkoxysilane, according to the process described in European Patent Application 459500, using a combination of a cationic surfactant and a nonionic surfactant. The resulting aminopolydimethylsiloxane copolymer had a viscosity of approximately 2,000 cP/mPa.s. This microemulsion contained 23% by weight of the copolymer which had a particle size in the microemulsion of 30 nanometer. Ten parts of Silicone Polyether D were added to 90 parts of this cationic aminofunctional microemulsion. An aqueous ethanol solution was then prepared by adding 15.4 parts of the resulting Silicone Polyether containing microemulsion to 26.6 parts of water, followed by the addition of 58 parts of ethanol. The resulting solution had an initial % Transmittance of 87 and was initially stable.

Example XV

A mechanical emulsion of a polydimethylsiloxane with a fluid viscosity of 60,000 cSt ($mm_2/S$) was prepared using a nonionic surfactant, by a standard technique described in European Patent Application 463431 published Jan. 2, 1992. The resulting mechanical emulsion contained 56% by weight of the polydimethylsiloxane which had a particle size in the emulsion of 260 nanometer. Silicone Polyether G was added at a level of 12 parts to 32 parts of water. This solution was then added to 56 parts of the mechanical emulsion. An aqueous ethanol solution was prepared by adding 15.62 parts containing 5 parts of the silicone active and the Silicone Polyether modified mechanical emulsion to 29.38 parts of water. After mixing briefly, 55 parts of ethanol was added. The solution remained milky-white, but it was homogeneous for an indefinite period of time.

Example XV-A Comparative

A control solution containing only the mechanical emulsion of Example XV without the Silicone Polyether separated within one hour.

The following examples demonstrate the stability of our alcohol stable emulsions and microemulsions in the presence of higher levels of alcohol by modification of pH.

Example XVI

Example VI was repeated and ten parts of Silicone Polyether E were added to 90 parts of Microemulsion A and mixed.

Example XVII

Ten parts of Silicone Polyether E were added to 90 parts of Microemulsion A and mixed. Dodecylbenzene sulfonic acid was added at a level of 0.50 weight percent which lowered the pH from 6.2 to 4.0.

Example XVIII

Ten parts of Silicone Polyether E were added to 90 parts of Microemulsion A and mixed. Dodecylbenzene sulfonic acid was added at a level of 0.75 weight percent which lowered the pH from 6.2 to 3.7.

Example XIX

Solutions were prepared for each blend in Examples XVI–XVIII as follows. To a container, 15.1 parts of each blend in Examples XVI–XVIII were added to 0.4 parts of water and mixed. Ethanol was then added in the amount of 83.5 parts. Although the % T of the solution containing the blend of Example XVI was initially 94, the % T fell to 38 within 24 hours. In contrast, and according to this feature of our invention, within the same period of time, the blend of Example XVII remained at 84% T, and the % T of the blend of Example XVIII remained at 90% T.

These results demonstrate the favorable effect of pH adjustments on incorporation of higher volumes of ethanol. The apparent pH of the blends were 5.0 for Example XVII and 4.5 for Example XVIII.

Solutions made according to our invention are especially useful in preparing personal care products, household care products, automotive care products, and coating products. In the personal care arena in particular, the products can be used in the treatment of hair, skin, or underarm.

Other variations may be made in compounds, polymers, copolymers, compositions, and methods described herein, without departing from the essential features of our invention. The forms of our invention are exemplary only, and not intended as limitations on their scope as defined in the appended claims.

We claim:

1. A method of making a solution of an alcohol stable emulsion or microemulsion containing an organopolysiloxane comprising polymerizing a cyclic siloxane in an aqueous medium containing the cyclic siloxane, a nonionic surfactant, an ionic surfactant, and a catalyst, until an organopolysiloxane is obtained; adding a silicone polyether to the organopolysiloxane containing emulsion or microemulsion and mixing the silicone polyether and the organopolysiloxane containing emulsion or microemulsion to form a blend; and adding the blend of the silicone polyether and the organopolysiloxane containing emulsion or microemulsion to aqueous alcohol to form the solution.

2. A method according to claim 1 including the step of cooling the blend of the silicone polyether and the organopolysiloxane containing emulsion or microemulsion to a temperature below 20°–25° C. before adding the blend of the silicone polyether and the organopolysiloxane containing emulsion or microemulsion to aqueous alcohol.

3. A method according to claim 2 in which the silicone polyether has the formula $MD_{10-1,000}D'_{1-100}M$, where M is monofunctional unit $R_3SiO_{1/2}$; D is difunctional unit $R_2SiO_{2/2}$; D' is difunctional unit $RR'SiO_{2/2}$; R is an alkyl group containing 1–6 carbon atoms or an aryl group; and R' is an oxyalkylene containing moiety.

4. A method according to claim 3 in which R' further includes oxyethylene (EO) and oxypropylene (PO) units in the ratio $EO_{10-100}PO_{0-100}$; a divalent radical —$C_mH_{2m}$— where m is 2–8 for connecting the oxyalkylene portion of moiety R' to the siloxane backbone of the silicone polyether; and a terminating radical for the oxyalkylene portion of moiety R' selected from the group consisting of hydrogen, hydroxyl, alkyl, aryl, alkoxy, and acyloxy.

5. A method according to claim 2 in which the silicone polyether has the formula $M'D_{10-1000}D'_{0-100}M'$, where M' is monofunctional unit $R_2R'SiO_{1/2}$; D is difunctional unit $R_2SiO_{2/2}$; D' is difunctional unit $RR'SiO_{2/2}$; R is an alkyl group containing 1–6 carbon atoms or an aryl group; R' is an oxyalkylene containing moiety.

6. A method according to claim 5 in which R' further includes oxyethylene (EO) and oxypropylene (PO) units in the ratio $EO_{10-100}PO_{0-100}$; a divalent radical —$C_mH_{2m}$— where m is 2–8 for connecting the oxyalkylene portion of moiety R' to the siloxane backbone of the silicone polyether; and a terminating radical for the oxyalkylene portion of moiety R' selected from the group consisting of hydrogen, hydroxyl, alkyl, aryl, alkoxy, and acyloxy.

7. A method according to claim 1 in which the pH of the blend of the silicone polyether and the organopolysiloxane containing emulsion or microemulsion is lowered to less than about five prior to adding the blend of the silicone polyether and the organopolysiloxane containing emulsion or microemulsion to aqueous alcohol to form the solution.

8. A solution prepared according to the method in claim 1.

9. A personal care product, household care product, automotive care product, or coating product containing the solution of claim 8.

10. A method of treating hair, skin, or underarm comprising applying to the hair, skin, or underarm, a product containing the solution of claim 8.

11. A method of making a solution of an alcohol stable emulsion or microemulsion containing an organopolysiloxane comprising mechanically preparing an emulsion or microemulsion in an aqueous medium containing an organopolysiloxane, and at least one surfactant; adding a silicone polyether to the organopolysiloxane containing emulsion or microemulsion and mixing the silicone polyether and the organopolysiloxane containing emulsion or microemulsion to form a blend; and adding the blend of the silicone polyether and the organopolysiloxane containing emulsion or microemulsion to aqueous alcohol to form the solution.

12. A method according to claim 11 including the step of cooling the blend of the silicone polyether and the organopolysiloxane containing emulsion or microemulsion to a temperature below 20°–25° C. before adding the blend of the silicone polyether and the organopolysiloxane containing emulsion or microemulsion to aqueous alcohol.

13. A method according to claim 12 in which the silicone polyether has the formula $MD_{10-1000}D'_{1-100}M$, where M is monofunctional unit $R_3SiO_{1/2}$; D is difunctional unit $R_2SiO_{2/2}$; D' is disfunctional unit $RR'SiO_{2/2}$; R is an alkyl group containing 1–6 carbon atoms or an aryl group; and R' is an oxyalkylene containing moiety.

14. A method according to claim 13 in which R' further includes oxyethylene (EO) and oxypropylene (PO) units in the ratio $EO_{10-100}PO_{0-100}$; a divalent radical —$C_mH_{2m}$— where m is 2–8 for connecting the oxyalkylene portion of moiety R' to the siloxane backbone of the silicone polyether; and a terminating radical for the oxyalkylene portion of moiety R' selected from the group consisting of hydrogen, hydroxyl, alkyl, aryl, alkoxy, and acyloxy.

15. A method according to claim 12 in which the silicone polyether has the formula $M'D_{10-1,000}D'_{0-100}M'$, where M' is monofunctional unit $R_2R'SiO_{1/2}$; D is difunctional unit $R_2SiO_{2/2}$; D' is difunctional unit $RR'SiO_{2/2}$; R is an alkyl group containing 1–6 carbon atoms or an aryl group; R' is an oxyalkylene containing moiety.

16. A method according to claim 15 in which R' further includes oxyethylene (EO) and oxypropylene (PO) units in the ratio $EO_{10-100}PO_{0-100}$; a divalent radical —$C_mH_{2m}$— where m is 2–8 for connecting the oxyalkylene portion of moiety R' to the siloxane backbone of the silicone polyether; and a terminating radical for the oxyalkylene portion of moiety R' selected from the group consisting of hydrogen, hydroxyl, alkyl, aryl, alkoxy, and acyloxy.

17. A method according to claim 11 in which the pH of the blend of the silicone polyether and the organopolysiloxane containing emulsion or microemulsion is lowered to less than about five prior to adding the blend of the silicone polyether and the organopolysiloxane containing emulsion or microemulsion to aqueous alcohol to form the solution.

18. A solution prepared according to the method in claim 11.

19. A personal care product, household care product, automotive care product, or coating product containing the solution of claim 18.

20. A method of treating hair, skin, or underarm comprising applying to the hair, skin, or underarm, a product containing the solution of claim 18.

\* \* \* \* \*